US008523278B2

(12) United States Patent
Renaudin

(10) Patent No.: US 8,523,278 B2
(45) Date of Patent: Sep. 3, 2013

(54) SLIDING ROOF DEVICE, IN PARTICULAR FOR A MOTOR VEHICLE

(75) Inventor: Fabrice Renaudin, Les Chatteliers Chateaumur (FR)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/381,295

(22) PCT Filed: Jul. 7, 2010

(86) PCT No.: PCT/EP2010/004182
§ 371 (c)(1),
(2), (4) Date: Feb. 17, 2012

(87) PCT Pub. No.: WO2011/003617
PCT Pub. Date: Jan. 13, 2011

(65) Prior Publication Data
US 2012/0169091 A1   Jul. 5, 2012

(30) Foreign Application Priority Data

Jul. 10, 2009   (FR) ..................... 09 03404

(51) Int. Cl.
*B60J 7/057*   (2006.01)
*B60J 7/047*   (2006.01)

(52) U.S. Cl.
USPC ............... 296/223; 296/216.03; 296/216.05

(58) Field of Classification Search
USPC ............................................ 296/216.01–224
See application file for complete search history.

(56) References Cited

U.S. PATENT DOCUMENTS

| 4,647,105 | A  | * | 3/1987  | Pollard ...................... 296/221 |
| 5,259,662 | A  | * | 11/1993 | Huyer ......................... 296/221 |
| 7,252,327 | B2 | * | 8/2007  | Sawada et al. ........... 296/216.03 |
| 7,296,851 | B2 | * | 11/2007 | Kronseder et al. ....... 296/216.03 |
| 7,784,859 | B2 | * | 8/2010  | Grimm et al. ................ 296/223 |
| 2002/0163228 | A1 | | 11/2002 | Wingen et al. |

FOREIGN PATENT DOCUMENTS

| DE | 4108197 A1 | 9/1991 |
| EP | 1403113 A1 | 3/2004 |

OTHER PUBLICATIONS

International Search Report dated Aug. 26, 2010 for PCT/EP2010/004182.

* cited by examiner

*Primary Examiner* — Dennis Pedder
(74) *Attorney, Agent, or Firm* — Fitch Even Tabin & Flannery LLP

(57) ABSTRACT

A sliding roof device for a vehicle, in particular for an automobile, is provided. The device has a movable panel, the front region of which is mounted such that it is slidable in the longitudinal direction of the vehicle, while the rear region is hinged to at least one push-out lever that is likewise mounted such that it is slidable in the longitudinal direction of the vehicle. The sliding roof device additionally comprises drive devices configured to displace the movable panel by directly driving each push-out lever in the direction of a displacement in the longitudinal direction of the vehicle.

8 Claims, 7 Drawing Sheets

SLIDING ROOF DEVICE, IN PARTICULAR FOR A MOTOR VEHICLE

CROSS REFERENCE TO RELATED APPLICATIONS

This application is a national phase application of International Application No. PCT/EP2010/004182, filed Jul. 7, 2010, designating the United States and claiming priority to French application Ser. No. 09/03404, filed Jul. 10, 2009, both of which are incorporated by reference herein in their entirety.

FIELD OF THE INVENTION

The present invention relates to a sliding roof device.
The invention is used particularly advantageously, but not exclusively, in the automotive industry.

BACKGROUND

In sliding roof devices known from the prior art, a slidably mounted panel is often used. A sliding roof is disclosed in DE 41 08 197 A1 in which the front region of the movable panel is articulated to sliding members. The sliding members are slidably mounted along lateral guide rails which are positioned on both sides of a roof opening which is able to be covered or exposed by means of the panel. The rear region of the panel is articulated to the end of lateral raising levers which are slidably mounted along two guide rails which are arranged on both sides of the roof of the vehicle. When such a sliding roof device is able to be actuated by means of a motor, the opening and closing of the sliding panel generally takes place by slidably driving the front sliding members by means of cables connected to an electric motor.

This type of sliding roof, however, has the drawback that the mechanism thereof requires a relatively large constructional space. Such a sliding roof also has further drawbacks, however, which are associated, in particular, with the lever arm action of the rear raising lever. The additional force required at the end of the closing phase and rattling when displacing the movable panel may be cited here, in particular.

Thus the object to be solved by the subject of the present invention is to propose a sliding roof device for a vehicle, in particular for an automobile, which permits markedly improved operating properties and at the same time easier integration into the vehicle roof.

SUMMARY

The solution of the technical object set forth according to the present invention is that the sliding roof device also comprises drive devices which are able to displace the movable panel by directly driving the rear raising devices in longitudinal translation.

It should be stressed that in the entire text all terms relative to spatial positioning refer to the longitudinal axis of the vehicle and the normal direction of travel thereof. This applies, in particular, to the terms "transverse" "longitudinal" "front" and "rear".

It is also important to make clear that the term "translation" has to be understood in a broad sense, i.e. it denotes equally linear translation, curved translation or any combination of these two types of movement.

In any case, the invention provides the advantage of a mechanism which permits a rapid raising of the rear region of the movable panel. The constructional space required by the mechanism to the side and in the longitudinal direction around the movable panel may be markedly reduced. The sliding roof device according to the invention, therefore, may be installed much more easily in the limited available vertical space of a vehicle roof, whereby advantages result both from the purely technical and aesthetic point of view.

The present invention also relates to features of the subclaims and those which are revealed from the following description and which have to be considered individually or in all possible technical combinations thereof.

BRIEF DESCRIPTION OF THE DRAWINGS

This description, which serves as a non-limiting example, is intended to make more comprehensible what the invention consists of and how it can be implemented. Moreover, the description is made with reference to the accompanying drawings, in which:

FIGS. 16-22 show longitudinal sections which illustrate the kinematic system of the movable panel belonging to the sliding roof device, wherein FIG. 16 shows the movable panel in the closed position, FIGS. 17-19 show the movable panel during the displacement from the closed position into the raised position, FIG. 20 shows the movable panel in the raised position, and FIGS. 21-22 show the movable panel during the displacement from the raised position into the open position.

For reasons of clarity, the same elements have been provided with the same reference numerals. In addition, only the elements which are important for understanding the invention have been shown, and without considering the scale and schematically.

DETAILED DESCRIPTION

Figure 1:
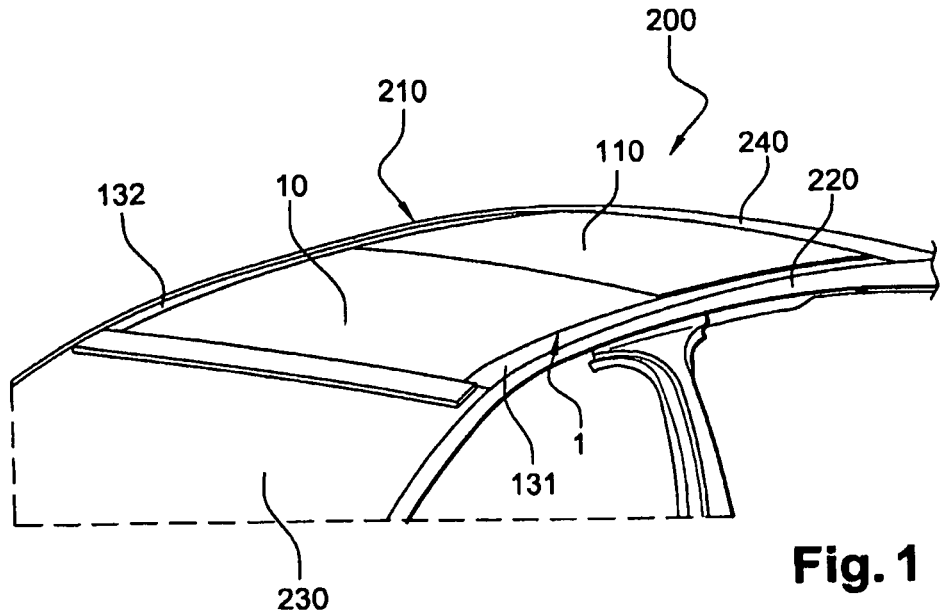
FIG. 1 shows a motor vehicle roof with an inserted roof module which contains a sliding roof device according to the invention, wherein the movable panel belonging to the sliding roof device is shown in the closed position.

FIG. 1 illustrates a roof 210 of a motor vehicle 200 which is provided with a sliding roof device 1 which uses a movable panel 10 made of glass. In this particular embodiment, which is only selected as an example, the sliding roof device 1 is integrated in a module 100 which combines two glass panels, namely the movable front panel 10 and a fixed rear panel 110. The module 100 takes up practically the entire surface of the vehicle roof, as in the transverse direction it covers the entire space located between the two upper side members 220, whilst in the longitudinal direction it extends practically from the windshield 230 to the rear window, whereby the sheet metal region of the vehicle roof is reduced to a single strip 240 over a rear transverse member.

Figure 2:
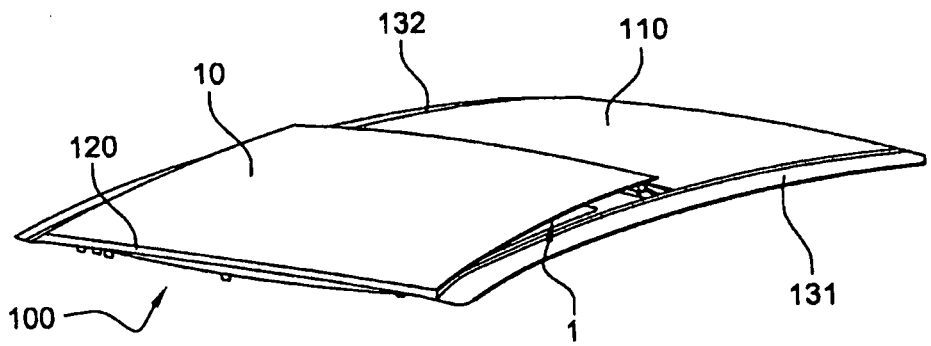
FIG. 2 shows the module according to FIG. 1, wherein the movable panel is in the raised position.

As may be seen in FIG. 2, the module 100 uses a frame 120 which serves as a support for the sliding roof device 1 and for the fixed rear panel 110, whereby a uniform and modular character is lent to the entire module. The frame 120 also ensures a function of connecting to the body of the vehicle 200 as it is designed so that it may be directly fastened to the box body of the vehicle 200. Two decorative strips 131, 132 cover the side profiles of the frame 120.

Figure 3:
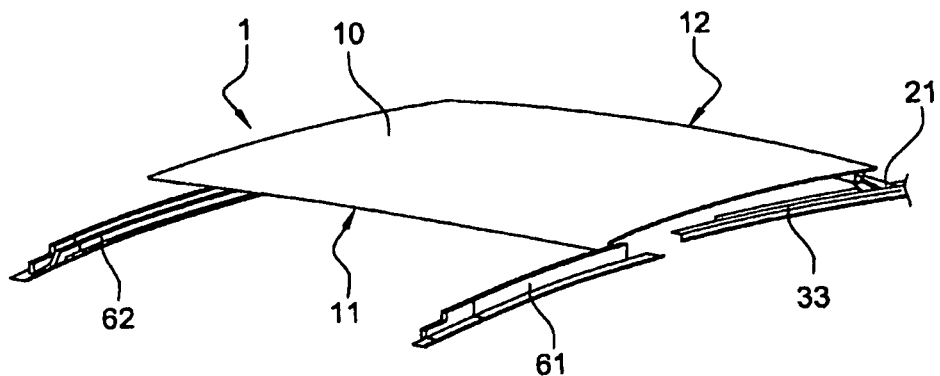
FIG. 3 shows the sliding roof device belonging to the module according to FIG. 2, wherein the movable panel is in the open position.

FIG. 3 shows that the sliding roof device 1 is provided with a panel 10, the front region 11 thereof being movably mounted for displacement in the longitudinal direction of the vehicle and the rear region 12 thereof being articulated to at least one raising lever 21, 22, which also is movably mounted for displacement in the longitudinal direction of the vehicle. The unit is arranged so that the panel 10 is slidably movable between a closed position (FIG. 1) in which it is able to close an opening in the roof 210 of the vehicle 200 and an open position (FIGS. 3 and 4), in which it is largely able to extend at a distance from the opening and substantially exposes said opening.

Figure 4:
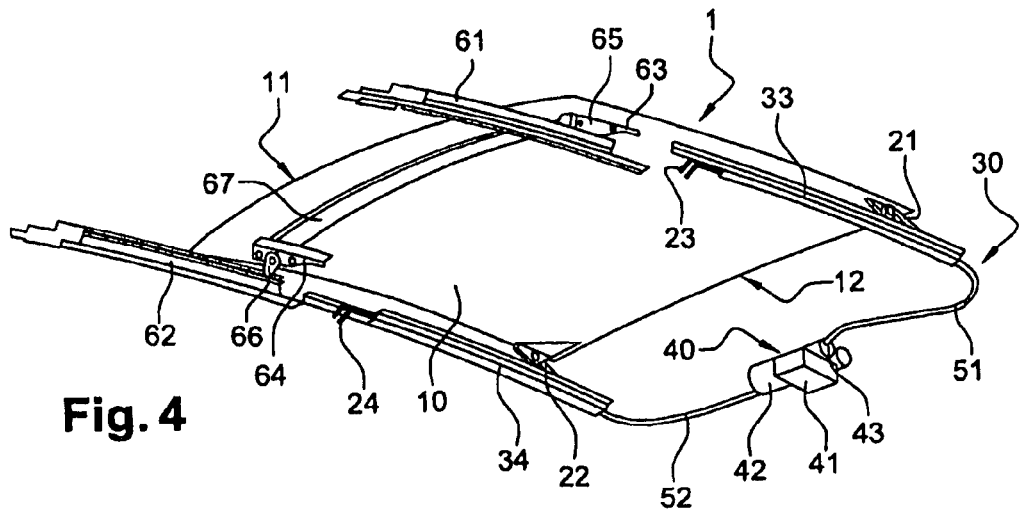
FIG. 4 shows a view as in FIG. 3 but according to a perspective view from below.
Figure 5:
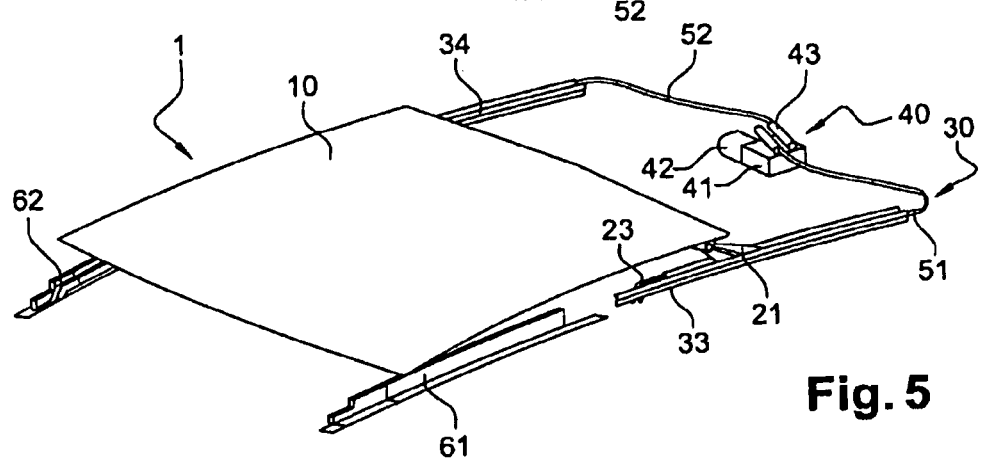
FIG. 5 shows a perspective view from above, similar to that according to FIG. 3, with the movable panel during its displacement between the closed position and the open position.

According to the subject of the present invention, FIGS. 4 and 5 show that the sliding roof device 1 also has drive devices 30 which are able to displace the movable panel 10 by directly driving each raising lever 21, 22 for displacement in the longitudinal direction of the vehicle.

Figure 6:
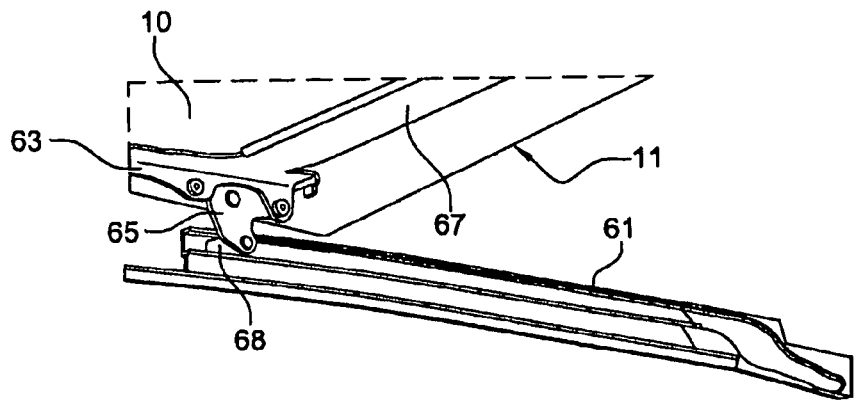
FIG. 6 shows one of the mechanical connections which ensure the retention and the sliding guidance of the front region of the movable panel, wherein the movable panel is in the open position.
Figure 7:
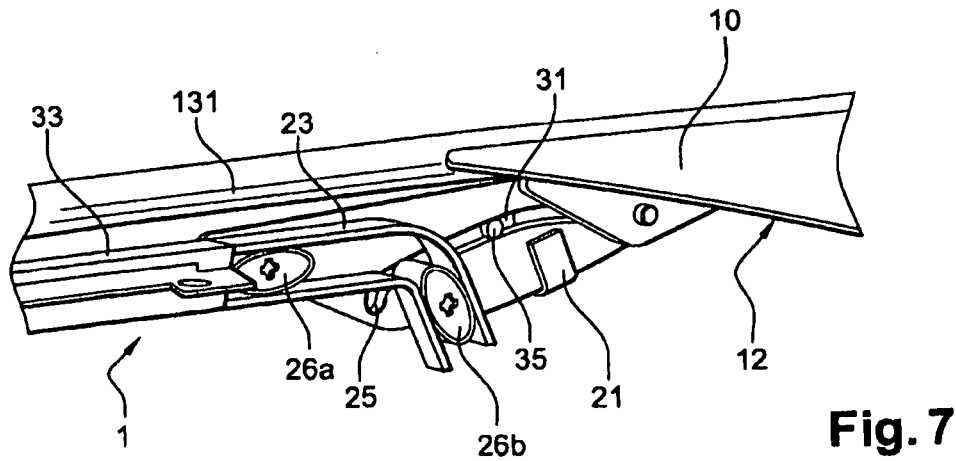
FIG. 7 shows, viewed from the inside, one of the mechanical connections which ensure the retention and the sliding guidance of the rear region of the movable panel, wherein the movable panel is at the start of the opening phase.
Figure 8:
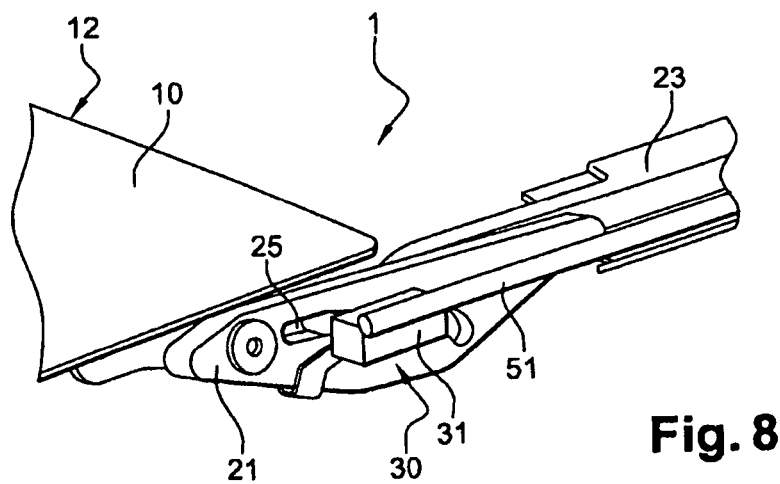
FIG. 8 shows the mechanical connection of the rear region of the movable panel in a view as in FIG. 7, considered from the outside.
Figure 9:
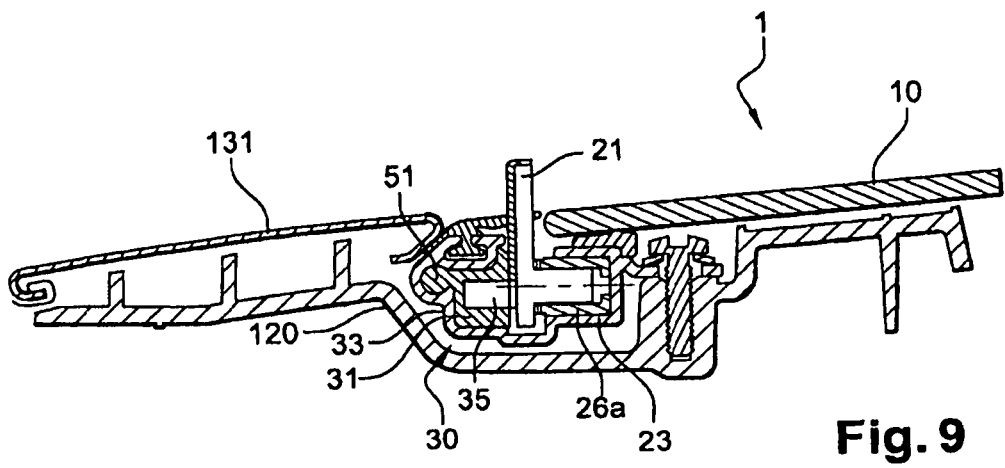
FIG. 9 shows a cross section through the mechanical connection according to FIGS. 7 and 8, FIGS. 10-11 show views similar to FIGS. 7 and/or 8 with the movable panel in the closed position.
Figure 10:
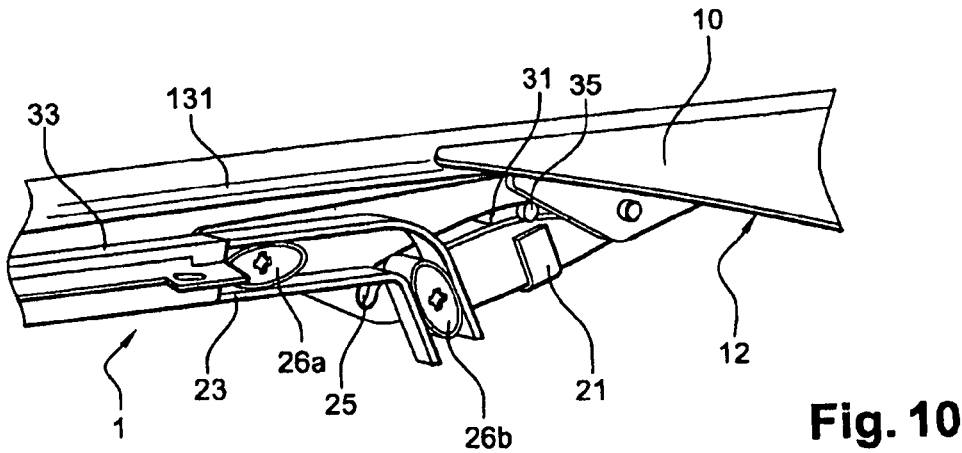
Figure 11:
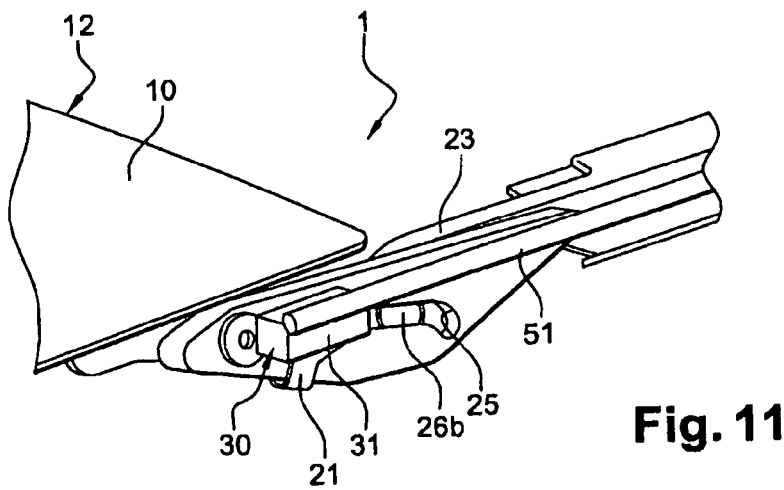
Figure 12:
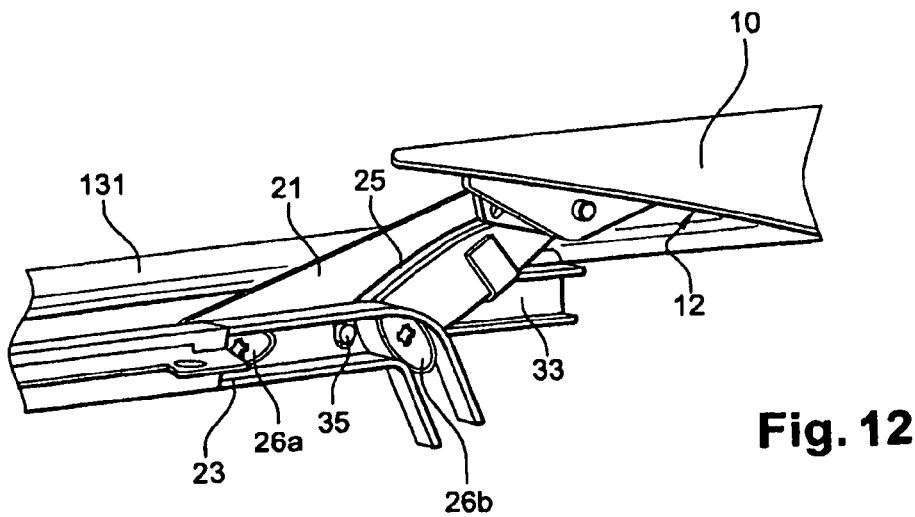
FIGS. 12-13 show views as in FIGS. 7 and/or 8 with the movable panel at the start of the opening phase.
Figure 13:
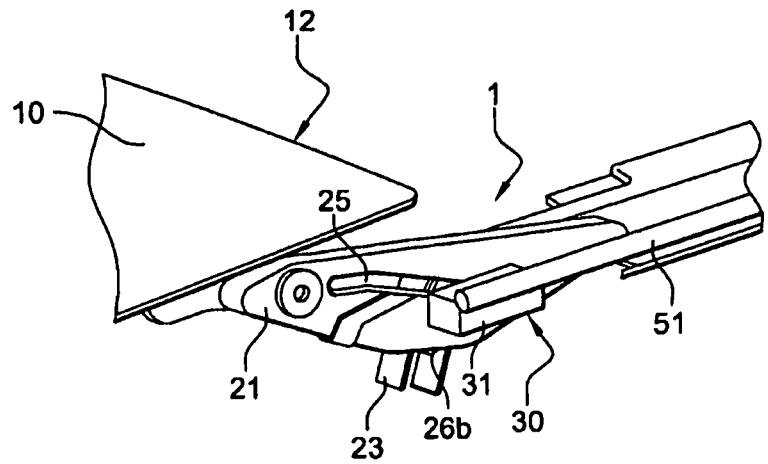
Figure 14:
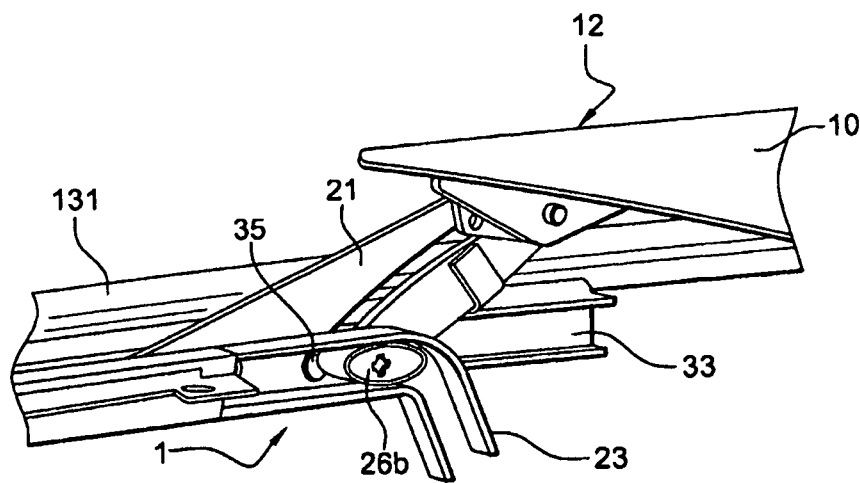
FIG. 14 shows a view similar to FIG. 8 with the movable panel in the raised position.
Figure 15:
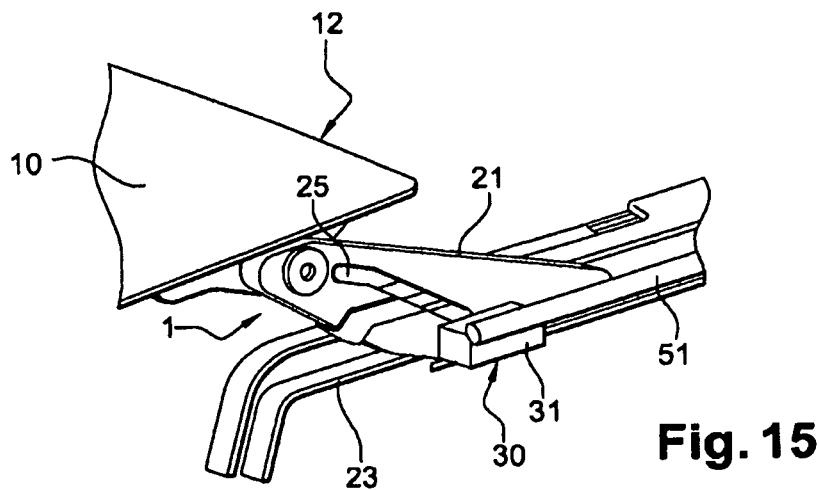
FIG. 15 shows a view as in FIG. 8 with the movable panel in the middle of the sliding phase.

In this exemplary embodiment, the front region 11 of the movable panel 10 is slidably mounted on two front guide rails 61, 62 which are positioned on both sides of the opening. In practice, and as may be seen in FIGS. 4 and 6, two angled fittings 63, 64 are mounted under each corner of the front region 11 of the movable panel 10 and connected via a reinforcing crossmember 67. Each angled fitting 63, 64 also serves as an anchoring point for a support plate 65, 66, at the end thereof a sliding piece 68 being rotatably mounted which is able to slide along the corresponding guide rail 61, 62.

The rear region 12 of the movable panel 10 is in turn articulated to two lateral raising levers 21, 22, which are slidably mounted on two rear guide rails 23, 24 which are arranged substantially on the same axis on each side of the roof 210 of the vehicle 200, aligned with the guide rails 61, 62.

FIGS. 7 to 15 show that each rear guide rail 23, 24 has a front part which is inclined downward toward the inside of the vehicle 200 and even extends below the level of the opening. The unit is arranged so that when the movable panel 10 reaches the closed position, each inclined rail part of the guide rails 23, 24 is able to permit the corresponding raising lever 21, 22 to tilt substantially in the plane of the opening, and as a result to position the rear region 12 of the movable panel 10 flush relative to the fixed rear panel 110.

FIGS. 7 to 15 also show that each raising lever 21, 22 in its assigned rear guide rail 23, 24 slides by means of two independent sliding pieces 26a, 26b.

According to a particularity of the invention, the drive devices 30 are initially provided with at least one sliding member 31 which is coupled in terms of drive technology to a raising lever 21, 22 and is movably mounted in a translatory manner in a direction substantially parallel to the direction of displacement of the movable panel 10. Moreover, the drive devices 30 are also provided with drive mechanisms 40 which are connected to each sliding member 31 via a flexible connection member 51, 52, for example in the form of a drive cable which is guided in a manner which is rigid against pressure, and which are able to displace each raising lever 21, 22 simultaneously, by driving each sliding member 31 at the same time in longitudinal translation.

It is important to stress that the fact that a sliding member 31 is coupled in terms of drive to a raising lever 21, 22 means that these two elements are fixedly connected together in the broad sense of the phrase, i.e. they are connected together without the relevant connection necessarily being rigid.

It should also be noted that in this exemplary embodiment the sliding roof device 1 is motorized and that the drive mechanisms 40 comprise an actuator 41 which in the conventional manner combines an electric motor 42 and a gear mechanism 43. However, it is also possible to provide that the sliding roof device 1 is manually controlled and, for example, has drive mechanisms 40 which are present in the form of a mechanism which may be actuated manually by means of a crank.

Finally, it should be made clear that each flexible connecting member 51, 52 is able to be, a priori, of any type and/or of any construction. Particularly advantageously, however, each flexible connecting member 51, 52 of this exemplary embodiment advantageously consists of a drive cable in this case.

According to a preferred embodiment of the invention, the drive devices 30 comprise a sliding member 31 for each raising lever 21, 22 which is articulated to the movable panel 10. Each sliding member 31 is connected to the drive mechanisms 40 via a dedicated flexible connecting member 51, 52. The unit is arranged so that the drive mechanisms 40 are capable of displacing simultaneously both sliding members 31, 32 by pulling or pushing on all flexible connecting members 51, 52 at the same time.

Particularly advantageously, each sliding member 31 is slidably mounted along a rear guide rail 33, 34 which extends substantially parallel to the direction of displacement of the movable panel 10.

According to a further advantageous feature of the invention, each raising lever 21, 22 which is articulated to the movable panel 10 is slidably mounted along a further rear guide rail 23, 24 which is arranged in the longitudinal direction. The rear guide rail 33, 34 of each sliding member 31 is installed level with the further rear guide rail 23, 24 which is assigned to the corresponding raising lever 21, 22. As the guide rail 33, 34 of a sliding member 31 is installed level with the guide rail 23, 24 of the corresponding raising lever 21, 22, said two elements may advantageously be parts of a single component.

According to a further particularity of the invention, which is visible in particular in FIGS. 7 to 15, each sliding member 31 is coupled in terms of drive to the corresponding raising lever 21, 22 by means of a coupling element 35 which is configured in the form of a finger and which cooperates with a guide 25 by sliding, wherein the finger 35 is fixedly connected to the sliding member 31 and the guide 25 is arranged on the respective raising lever 21, 22.

This feature makes it possible to minimize the forces during closing. The sliding of the coupling element 35 in the guide 25 namely provides the possibility of dividing up the closing phase of the movable panel 10, by the guide 25 being accordingly designed.

In this connection, FIGS. 16 to 23 show that each guide 25 has a generally curved shape which is able to be divided up into three portions.

Figure 16:
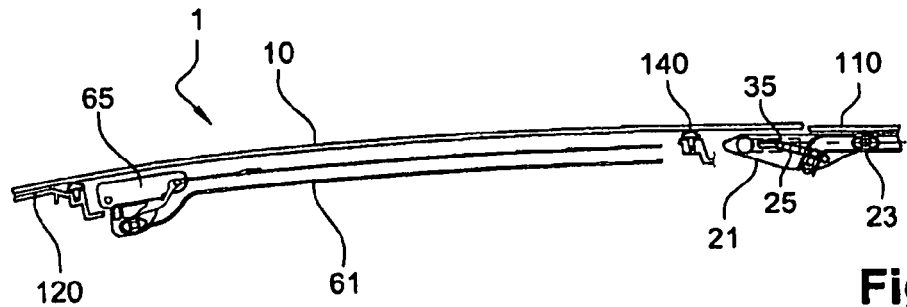

Initially, it is observed that the guide 25 is provided with a first, substantially straight portion 27 which extends substantially parallel to the direction of displacement of the sliding member 31 when the movable panel 10 is in the vicinity of its closed position (FIG. 16). The arrangement is configured so that the corresponding coupling element 35 is able to slide along the first portion 27 when the movable panel 10 is in the vicinity of its closed position.

This feature makes it possible to make use of an idle state at the very start of an opening phase and at each end of a closing phase of the movable panel 10.

Figure 17:
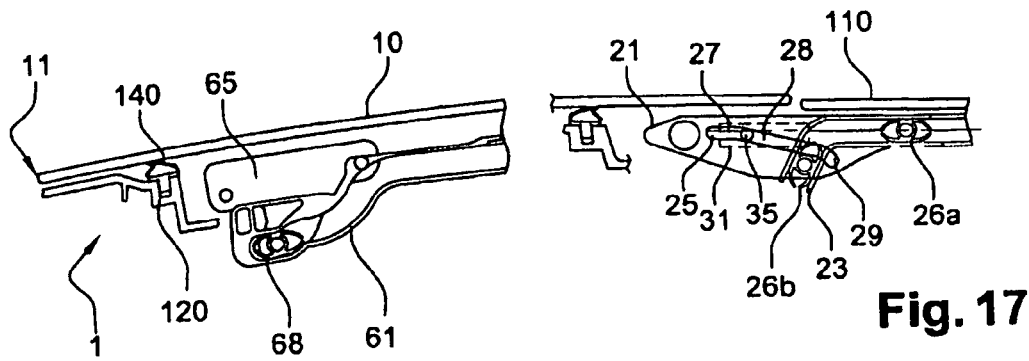
Figure 18:
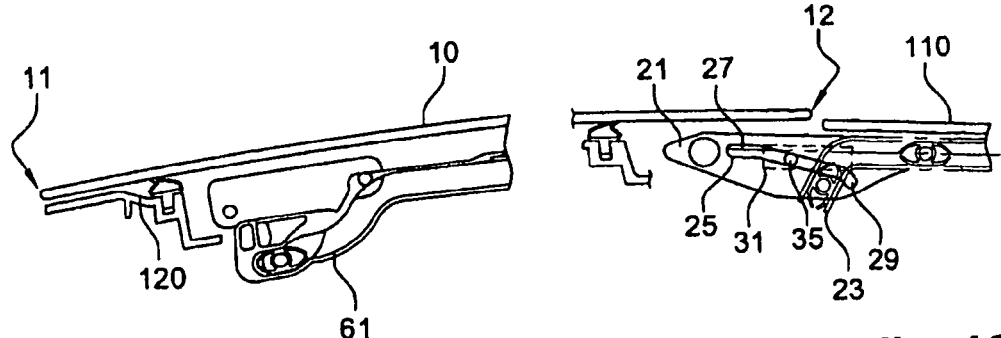
Figure 19:
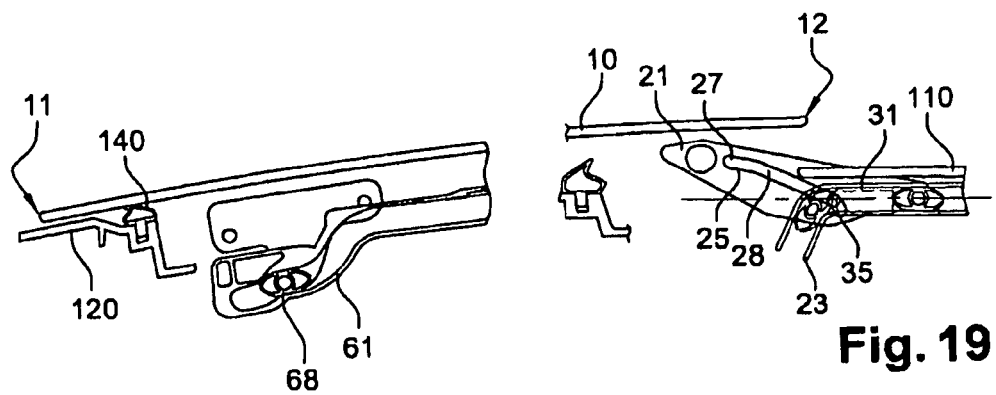

The guide 25 is also provided with a second, substantially straight portion 28 which extends obliquely relative to the direction of displacement of the sliding member 31 when the movable panel 10 is at the start of the opening phase or at the end of the closing phase (FIGS. 17 to 19). The arrangement is configured so that the corresponding coupling element 35 is able to slide along the second portion 28 when the movable panel 10 is actually located at the start of the opening phase or at the end of the closing phase.

This feature makes it possible to drive the raising lever 21, 22 progressively by means of the sliding member 31.

Figure 20:
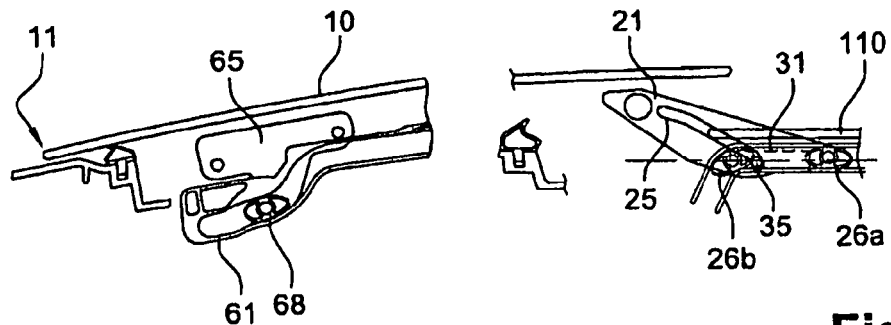
Figure 21:
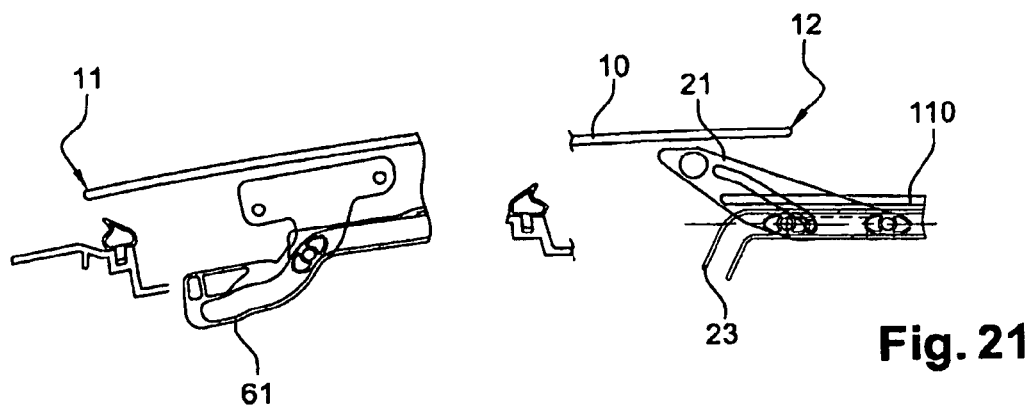
Figure 22:
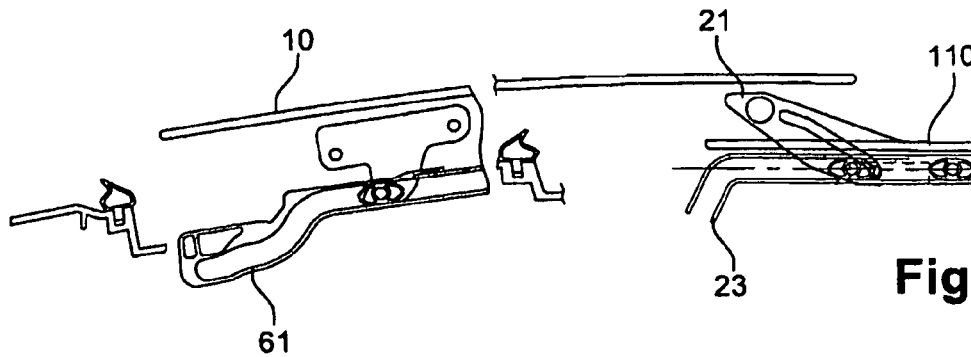

The guide 25 further comprises a third, substantially straight portion 29 which extends substantially perpendicular to the direction of displacement of the sliding member 31 when the movable panel 10 is in the middle of the opening phase or in the middle of the closing phase (FIGS. 20 to 22). The arrangement is configured so that the corresponding coupling element 35 comes to a standstill in the third portion 29, starting from the fully raised position of the rear edge of the movable panel 10 according to FIG. 20 and with the further displacement to the rear in the opening phase or with a reverse movement to the front in the closing phase.

This feature makes it possible to couple the raising levers 21, 22 and the sliding member 31 practically rigidly, whilst the movable panel 10 is displaced between its raised position and its fully open position. The raising levers 21, 22 are driven directly by the sliding member 31, wherein the tensile or thrust forces exerted on the sliding member 31 by the drive mechanisms 40 are entirely transmitted to the raising levers 21, 22.

It should be noted that in the three cases mentioned above, the alignment of the portion 27, 28, 29 of the guides 25 under consideration relative to the direction of displacement of the sliding member 31 depends both on their individual arrangement on the raising levers 21, 22 and on the position of the raising levers 21, 22 relative to the direction of displacement of the sliding member 31.

The longitudinal sections of the FIGS. 16 to 23 make it possible to understand easily the kinematic system for operating the sliding roof device 1 described above.

FIG. 16 shows, in particular, that the panel 10 in the closed position adjoins the fixed rear panel 110 in a flush manner. A lip seal 140 extends over the entire contour of the frame part 120 defining the opening in order to ensure a seal relative to the movable panel 10 when said panel is in the closed position, as in this case. As it is positioned level with the front inclined end of its guide rail 23, the raising lever 21 extends substantially horizontally inside the opening. The coupling element 35 is positioned in the first portion 27 of the guide 25. This means that the connection between the sliding member 31 and the raising lever 21 takes place at a point which is located as close as possible to the movable panel 10, which makes it possible to optimize the locking of the raising lever 21 in the closed position.

The opening phase of the movable panel 10 starts by activating the actuator 41 so that said actuator exerts via the cable 51 (not shown in FIGS. 16-22) a tensile force on the sliding member 31 and thus causes the sliding member 31 to slide along its guide rail 33 (FIG. 17), wherein the guide rail is also not shown here for reasons of clarity. During the very start of the opening phase, the coupling element 35 slides in the first portion 27 of the guide 25 which, due to the fact that the first portion 27 in this case is substantially co-linear to the direction of displacement of the sliding member 31, does not lead to any significant displacement of the movable panel 10.

As is visible in FIG. 18, the opening of the movable panel 10 effectively takes place when the coupling element 35 reaches the second portion 28 of the guide 25. Insofar as the sliding member 31 continues its translatory movement to the rear, the raising lever 21 is progressively driven to the rear in the direction of displacement due to the fact that the second portion 28 of the guide 25 is then inclined relative to the sliding direction of the sliding member 31. As a result, a similarly gradual raising of the raising lever 21 is produced at the same time.

When the coupling element 35 reaches the rear end of the second portion 28 of the guide 25, as in FIG. 19, the movable panel 10 is located in the vicinity of its raised position. Its front region, in this case, is only moved very slightly to the rear whilst its rear region 12 is significantly raised, in turn.

The raised position is finally reached as soon as the coupling element 35 is inserted into the third portion 29 of the guide 25 according to FIG. 20. The fact that the raising lever 21 is now substantially rigidly connected to the sliding member 31 makes it possible to maintain this position permanently, whilst the drive mechanisms 40 are temporarily deactivated and, due to their self-locking, hold the sliding member 31 in this position. Precisely at this moment, the front region 11 of the movable panel 10 is still lowered to a relatively large extent, with its underside bearing against the front seal and well stabilized due to the fact that the sliding piece 68 is located in a substantially horizontal intermediate portion of its guide rail 61.

As is visible in FIG. 21, when the sliding member 31 is driven further to the rear, few geometric alterations occur level with the rear region 12 of the movable panel 10, as the panel 10 only moves in a purely straight translatory direction during the further opening movement. Level with the front region 11, this is different as said front region is forced to follow the lifting of the inclined part of its guide rail 61.

When this process is finished, the front region 11 of the movable panel 10 is also raised as in FIGS. 21 and 22. The displacement of the movable panel 10 to the rear is continued, therefore, by simply sliding level with the substantially straight parts of the guide rails 61, 62 relative to its front region 11 and level with the substantially straight parts of the guide rails 23, 24 relative to its rear region 12, until reaching the fully open position. It is observed that in this case the connection between the sliding member 31 and the raising lever 21 takes place at a point which is between the two sliding pieces 26a, 26b which advantageously enables the risk of the raising lever 21 rattling to be reduced.

As the closing of the movable panel 10 takes place according to a substantially reverse kinematic system or movement, this is not described further here.

Naturally, the invention relates more generally to any vehicle which has at least one sliding roof device 1 described above.

The invention claimed is:

1. A sliding roof device for a vehicle comprising a movable panel, the front region thereof being displaceably mounted in the longitudinal direction of the vehicle and the rear region thereof being articulated to at least one raising lever mounted pivotably and displaceably in the longitudinal direction of the vehicle; and drive devices configured to displace the movable panel by directly driving the raising lever in the direction of a displacement in the longitudinal direction of the vehicle;

wherein the drive devices comprise at least one sliding member which is coupled in terms of drive to a raising lever and is displaceably mounted in a direction substantially parallel to the direction of displacement of the movable panel; and drive mechanisms which are connected to each sliding member via a flexible connecting member and which are configured to displace each raising lever simultaneously by driving each sliding member at the same time in the direction of displacement in the longitudinal direction of the vehicle;

wherein each sliding member is coupled in terms of drive to the corresponding raising lever via a coupling element which is connected to the sliding member and which cooperates with a guide arranged on the raising lever; and wherein each guide comprises a substantially straight portion which extends substantially perpendicular to the direction of displacement of the sliding member when the movable panel is in a last part of its opening phase or in a first part of its closing phase, and wherein the corresponding coupling element is configured to be secured in the portion when the movable panel is in the respective opening phase or closing phase.

2. The sliding roof device as claimed in claim 1, wherein the drive devices comprise a sliding member for each raising lever which is articulated to the movable panel and wherein each sliding member is connected to the drive mechanisms via a dedicated flexible connecting member.

3. The sliding roof device as claimed in claim 1, wherein each sliding member is displaceably mounted on a guide rail which extends substantially parallel to the direction of displacement of the movable panel.

4. The sliding roof device as claimed in claim 1, wherein each raising lever is displaceably mounted along a guide rail which is arranged in the longitudinal direction and which is installed level with a sliding member rear guide rail, which is assigned to the corresponding raising lever.

5. The sliding roof device as claimed in claim 1, wherein each guide comprises a first, substantially straight portion which extends substantially parallel to the direction of displacement of the sliding member when the panel is closed and in that the coupling element is able to slide along the first portion when the movable panel is in the vicinity of its closed position.

6. The sliding roof device as claimed in claim 1, wherein each guide comprises a second, substantially straight portion which extends obliquely relative to the direction of displacement of the sliding member when the movable panel is at the start of the opening phase or at the end of the closing phase and wherein the corresponding coupling element is configured to slide along the second portion when the movable panel is located at the start of the opening phase or at the end of the closing phase.

7. A motor vehicle comprising a roof and at least one sliding roof device as claimed in claim 1.

8. A sliding roof device for a vehicle, for an automobile, which comprises a movable panel, the front region thereof being displaceably mounted in the longitudinal direction of the vehicle and the rear region thereof being articulated to at least one raising lever mounted pivotably and displaceably in the longitudinal direction of the vehicle along a guide rail which is arranged in the longitudinal direction, wherein the sliding roof device comprises drive devices which are able to displace the movable panel by directly driving the raising lever in the direction of a displacement in the longitudinal direction of the vehicle, and wherein each raising lever slides by means of sliding pieces in its assigned guide rail, each guide rail having a front part which is inclined downward and while moving the movable panel to its closed position the driven raising lever tilts downward as a front sliding piece of the sliding pieces slides downwards into the inclined front part of the guide rail, and wherein a sliding member of the drive device is coupled with the raising lever by means of a coupling element that can move along a guide formed on the raising lever.

* * * * *